Figure 1A:
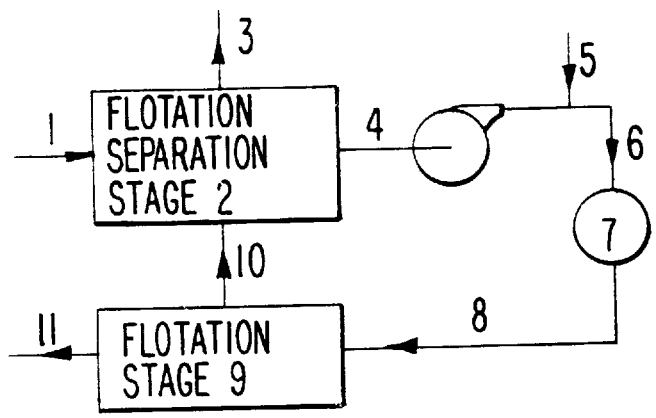

United States Patent

Agranonik et al.

[11] Patent Number: 5,849,191
[45] Date of Patent: Dec. 15, 1998

[54] WASTEWATER TREATMENT METHOD, METHOD OF SUSPENSIONS SEPARATION AND METHOD OF SATURATION OF LIQUID WITH GAS

[75] Inventors: Robert Yakovlevich Agranonik; Gennady Alexeevich Pisklov, both of Moscow, Russian Federation

[73] Assignee: Research and Development Company Bifar (RU/RU), Moscow, Russian Federation

[21] Appl. No.: 562,072

[22] Filed: Nov. 22, 1995

Related U.S. Application Data

[63] Continuation of PCT/RU94/00096, Apr. 28, 1994.

[30] Foreign Application Priority Data

May 25, 1993 [RU] Russian Federation ............ 93028161

[51] Int. Cl.⁶ .................................. C02F 1/24; C02F 3/12; C02F 9/00
[52] U.S. Cl. ........................ 210/608; 210/623; 210/703; 210/713; 210/715
[58] Field of Search ................................. 210/608, 623, 210/624, 625, 626, 703, 712, 713, 715

[56] References Cited

U.S. PATENT DOCUMENTS

| | | |
|---|---|---|
| 3,264,213 | 8/1966 | Pav . |
| 3,444,076 | 5/1969 | Sekikawa . |
| 4,085,041 | 4/1978 | Fullerton . |
| 4,271,027 | 6/1981 | Kelly . |
| 4,374,027 | 2/1983 | Seveveid . |
| 4,430,225 | 2/1984 | Takamatsu . |
| 4,460,470 | 7/1984 | Reimann . |
| 5,240,600 | 8/1993 | Wang . |

*Primary Examiner*—Thomas M. Lithgow
*Attorney, Agent, or Firm*—Michael N. Meller

[57] ABSTRACT

A wastewater treatment method involving mixing of the wastewater with an activated sludge and water that has been supersaturated with air under high pressure is described. After the pressure is reduced two processes are carried out which are biological oxidation of pollutants by activated sludge and flotation of suspended solids. A portion of the treated water is saturated with air and returned to the beginning of the process. The waste activated sludge is removed along with some floated and biologically non-oxidated pollutant particles.

2 Claims, 2 Drawing Sheets

WASTEWATER TREATMENT METHOD, METHOD OF SUSPENSIONS SEPARATION AND METHOD OF SATURATION OF LIQUID WITH GAS

This is a continuation of PCT/RU94/0096 filed Apr. 28, 1994.

FIELD OF INVENTION

The invention belongs to the field of wastewater treatment and, in general, could be used for biological municipal and industrial wastewater treatment, combined with a process of microflotation. In particular, this invention could be used as a separation method for suspensions containing pollutants that are not required to be biologically oxidized. Furthermore, the present process may be used in saturating liquids with gases, and also could be used at one of the stages of biological wastewater treatment as well as a separation method for suspensions. Also, could be used as an independent method in other areas.

BACKGROUND OF THE INVENTION

A prior art biological wastewater treatment method is described, where a two-chamber unit equipped with electrodes that generate oxygen and hydrogen is used (USSR Invention Certificate # 998381, C 02 F 3/00, priority 30.09.81). Sewage comes to the aeration chamber, where it has been saturated with oxygen, that is generated at the anode. Pollutants are oxidized to carbon dioxide by microorganisms that come from a flotation chamber. The intensive mixing which takes place in the aeration chamber, speeds up both the oxygen dissolving rate and oxidation of pollutants. After the pollutants are oxidized, sewage, along with microorganisms, go to the flotation chamber. Microorganisms are flotated there by hydrogen bubbles which are generated at the cathode. The floated microorganisms are returned to the aeration chamber, and the waste portion of the waste activated sludge is removed.

The described prior art method requires a considerable energy consumption, requires longer periods due to two stages of treatment and requires a lot of oxygen for complete oxidation of pollutants.

Another prior art method of suspensions separation as a sewage treatment method involving dissolved air flotation is one using a liquid that is saturated under pressure in a saturator (Deryagin B. V., Dukhin S. S., Rulev N. N. Micro flotation Moscow, "Chimiya" 1986, p. 76–79, drawing 30 h). The method includes the mixing of a suspension with flotoagent, a separation into the solid and liquid phase. Portion of the liquid phase is saturated with gas under pressure (i.e., a flotoagent) and supplied for mixing with a suspension (sewage) that undergoes the separation process.

This method also does not operate at a high rate and does not have high efficiency. Besides, the separator works under pressure, and there is a possibility of explosive conditions.

This prior art separator receives liquid and gas where they are in contact under pressure. The liquid that is saturated with gas goes out of the saturator. The liquid may be sewage and the gas may be an air. Undissolved gas goes back in the beginning of the process; the excessive portion of gas goes to the atmosphere, which is one of the disadvantages of the method.

SUMMARY OF THE INVENTION

In the present method, sewage is mixed with activated sludge and water that has been saturated with air under pressure. In the reactor, due to a pressure reduction, the dissolved air comes out of the water as microbubbles. These microbubbles slowly rise at the rate of 1 mm/second, floating the activated sludge along with pollutants. At the same time, the liquid is supersaturated with air at an external saturator which provides, along with flotation, all the necessary conditions for intensive biochemical oxidation of organic pollutants by activated sludge microorganisms.

To maintain the process continuity, a portion of the flotation activated sludge is returned to be mixed with sewage. The rest of the activated sludge is removed along with the portion of pollutants that haven't been oxidized. Treated waste water effluent is divided into two parts. One part exits the system and the other part is saturated with air under high pressure and then returned back to the reactor for mixing with untreated sewage.

Therefore, continuous circulation of a portion of the activated sludge portion as well as sewage is performed in this method. A certain ratio between these is maintained. Also, an important aspect is that biological oxidation of pollutants and flotation take place together and simultaneously in the same reaction chamber.

The present method of suspensions separation may also be used even when biological oxidation of pollutants is not required, and includes the supply of incoming suspension for mixing with a flotation agent and after flotation, separation into a solid and liquid phase. The solid phase is removed continuously, the liquid phase is saturated under excessive pressure in the saturator and then supplied to the additional flotation stage; after this stage the clarified liquid is removed; flotocomplexes (i.e., water which has been saturated with air) that are generated at this stage are used as a flotoagent which are mixed with incoming suspensions.

According to another option for using the present method is one where the liquid phase which has been saturated with air are divided into two different streams. One of these streams is used for additional flotation, while the other one is used for mixing with incoming suspension.

As a third option, the clarified liquid is divided into two streams; one of these is removed, its volume being equal to the difference between the volumes of incoming suspension and outgoing solid phase; the other one stream is supplied along with liquid phase for saturation with air.

Saturation of liquid with air in the present processes could be implemented using any other known conventional way; but one economical and preferable method is a method described below.

As it is described by Deryagin B. V. and others (see above), the method of liquid saturation with gas includes the supplying of the liquid along with gas under pressure into a saturator, recirculation of the undissolved gas, withdrawal of liquid which has been saturated with air and, removal of excessive undissolved gas. However, as it is in the present invention, the saturator is designed not in the form of a tank or apparatus (Deryagin's saturator is a tank), but as an array of pipes arranged in the form of at least two loops which have one section in common. Pipes are positioned vertically or have positioned close to be vertical; the array of the structure includes uprising and downflowing streams; also, there are two injectors located one after another in the upper portion of the pipe where the downflowing stream is located. This stream is divided into two flows each of which goes into each injector which maintains joint recirculation of liquid along with gas that is still undissolved. During such recirculation, a complete saturation of liquid with gas takes place. Excessive undissolved gas is withdrawn along with which has been saturated with gas. The withdrawal of the saturated liquid is performed from the upper part of the pipe where the uprising stream is located. During the preferred option of the process, liquid that has been saturated with gas, are withdrawn through the pipe that is down-angled.

These methods will be described in greater detail using examples of the application as found below.

BRIEF DESCRIPTIONS OF THE ACCOMPANYING FIGURES

FIGS. 1(a), (b) and (c) show various possible flow arrangements according to the invented method of suspensions separation.

Figure 1B:
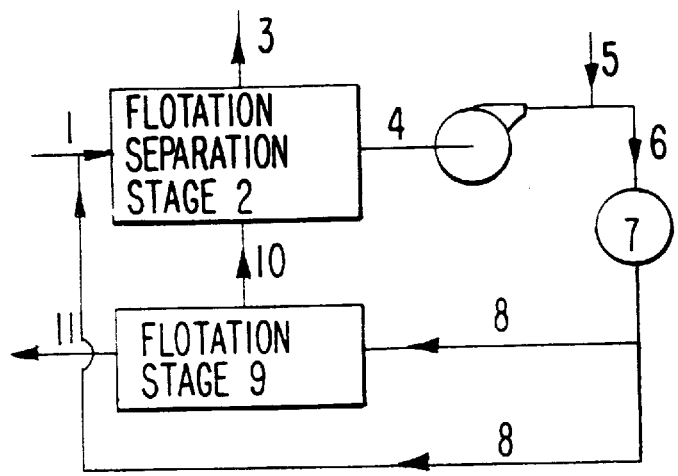
Figure 1C:
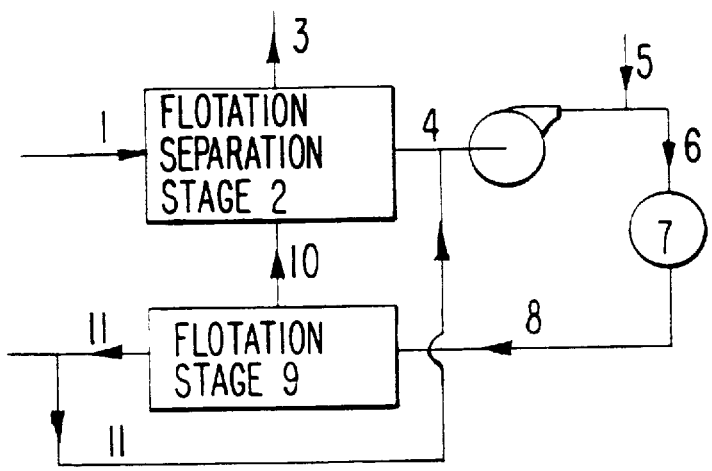

There are following positions on the drawings:

1—incoming suspension stream
2—flotation separation zone or stage
3—solid phase removal
4—liquid phase goes to be mixed with air
5—air supplying stream
6—water-air phase goes to saturator
8—liquid phase saturated with air goes to the additional flotation stage 9 (also, in FIG. 1(b) to the flotation separation stage 2)
10—withdrawal of flotocomplexes from the stage 9 to the stage 2 (suspension flotation separation)
11—exit of clarified liquid (also to the mixing with air, as in FIG. 1(b)

Flotation separation and additional flotation stages are numbered on these figures differently (#2 and #9) which does not mean that they each require different unit. More often, these stages are located in different zones of the same unit. Flotation separation stage/zone is located in the upper portion and an additional flotation stage/zone is located in the bottom portion of the unit. A horizontal screen in the middle of the unit may serve as a border between these zones; it is located slightly above the inlet of the liquid phase that is saturated with air.

Figure 2A:
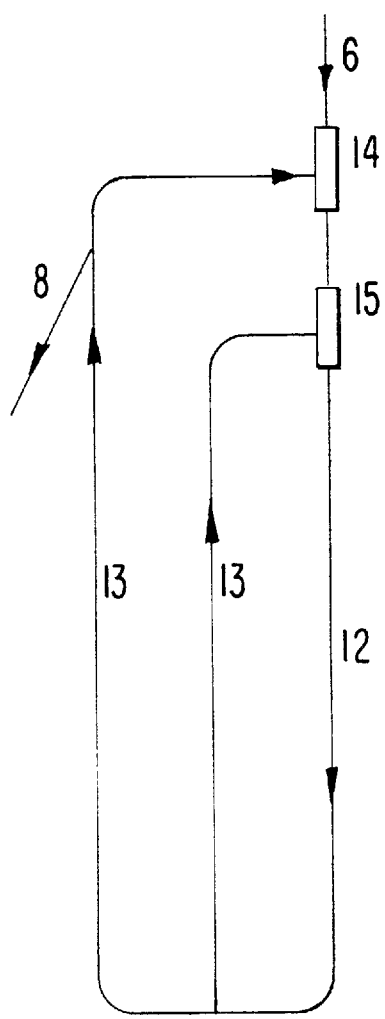
Figure 2B:
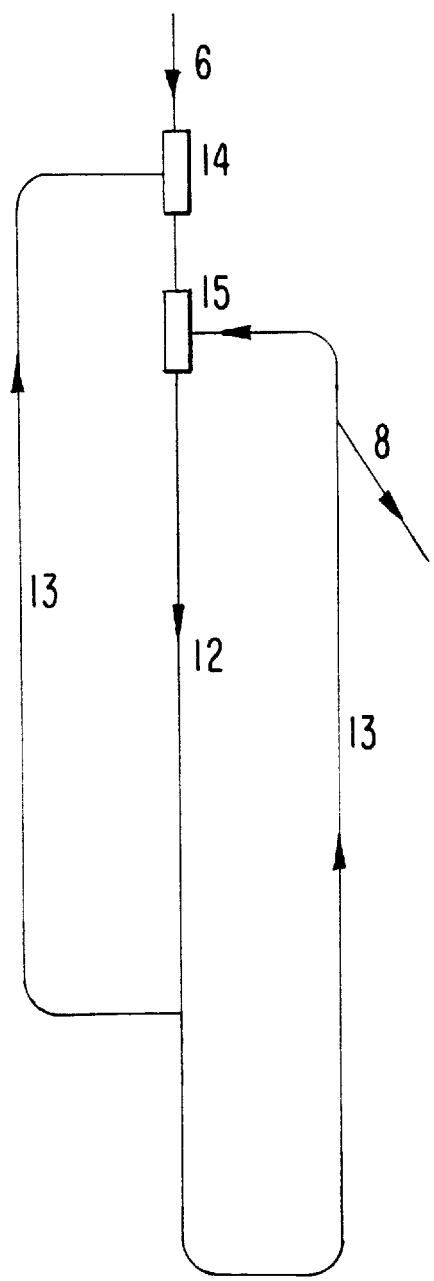

There are two versions of pipe arrangements equipped with injectors, which can be used as saturators. (FIGS. 2(a) and 2(b))

The pipe where the flow goes down is numbered #12, uprising flow is #13, upper injector is #14, bottom injector is #15.

These methods will be disclosed in more detail in the following Examples.

EXAMPLE 1

Municipal sewage that had a BOD (Biological Oxygen Demand) 150 mg/L and SS (Suspended Substances) 150 mg/L was mixed in the reactor with activated sludge (activated sludge dose was 25–30 g/L) and water (that was saturated with air under pressure of 0.8 MPa) according to the volume ratio of 1:1:2. Activated sludge and water (that which was saturated with air) was withdrawn at the system exit and then supplied to the head of the process. Waste activated sludge having a 94–96% water content along with unoxidized part of pollutants was removed from the surface of the reactor.

The resulting concentration of pollutants in the treated water was: BOD=4 mg/L and SS=5 mg/L while the process duration was equal to 1.8 hrs. Using the conventional known method for treating wastewater having the same input parameters after treated for 4.2 hrs gave the following results: BOD=15 mg/L and SS=12 mg/L.

EXAMPLE 2

Wastewater that had been generated at the yeast growing and processing factory—Q=100 m$^3$/hr, SS=4 g/L was pumped to the flotation separator. At the same time, flotocomplexes from a stage of additional flotation were simultaneously introduced to the separator serving as a flotoagent. The duration of the flotation separation process was 0.9 hours. The solid phase of the suspension, which was concentrated on the surface was removed continuously using a transporting mechanism. The liquid phase after the flotation separation (Q=120 m$^3$/hr) was saturated under excessive pressure equal to P=0.65 Mpa and then supplied for additional flotation, where, as a result of pressure drop/reduction (down atmospheric pressure) the bubbles of air were extracted and attached to the surface of the fine solid phase particles. The flotocomplexes which were generated after they had risen up to the surface, were supplied along with the excessive volume of the liquid phase (20 m$^3$/hr) to the flotation separation, using it as a flotoagent (FIG. 1(a)).

The clarified liquid that had an SS concentration=45 mg/L and was removed from the additional flotation stage. The duration of additional flotation stage was 0.4 hrs; total duration of the process was 1.3 hrs.

In the known method the concentration of suspended solids in the liquid phase after separation was 240 mg/L while duration of the process was 1.8 hrs.

EXAMPLE 3

Activated sludge (Q=100 m$^3$/hr, incoming SS=5 g/L) was used for flotation separation simultaneously along with the flotoagent (flotocomplexes from the stage of additional flotation). The duration of the flotation separation was equal to 1.5 hrs. The solid phase in the form of the a foam product was removed from the surface of the flotator; the liquid phase (Q=200 m$^3$/hr) was saturated with air under a pressure of about P=0.35 MPa. After the saturation, the liquid phase was divided into two equal streams, one of which was supplied to the additional flotation stage, and the other one went to be mixed with the incoming suspension (activated sludge) (FIG. 1(b)).

The clarified liquid which was removed after the additional flotation contained SS=25 mg/L. The duration of the additional flotation was 0.4 hrs.

Comparing to the known method, the SS concentration in the clarified water are reduced from 70 to 25 mg/L; the duration of the process could be reduced as well from 2.4 to 1.9 hrs.

EXAMPLE 4

Activated sludge (Q=100 m$^3$/hr, SSin=5 g/L) were supplied to the stage of the flotation separation simultaneously along with flotoagent (flotocomplexes from the additional stage phase). The solid phase in the form of foam (Q=10 m$^3$/hr) was removed from the surface of the flotator. The liquid phase (Q=100 m$^3$/hr) along with the portion of the clarified liquid from the stage of additional flotation (Q=100 m$^3$/hr) was saturated with air under P=0.35 MPa. The liquid that was saturated with air (Q=200 m$^3$/hr) was supplied to the additional flotation stage where the pressure was reduced and as a result small bubbles of air were separated from this supersaturated solution. The bubbles became attached to the surface of fine particles of the solid phase; thus flotocomplexes were formed. These flotocomplexes along with the part of the liquid phase (10 m$^3$/hr) were supplied to stage of flotation separation. The clarified liquid phase, after the stage of additional flotation was divided into two different streams one of which (Q=90 m³/hr) the other one (Q=100 m³/hr) was supplied along with the liquid phase for the saturation with air after the flotation saturation stage (FIG. 1(b)).

The duration of the flotation separation stage was 0.75 hrs, while the additional flotation stage lasted 0.85 hrs. The concentration of suspended solids in the clarified liquid was SSout=25 mg/L.

EXAMPLE 5

Pretreated municipal sewage (Q=40 m³/hr) at T=20° C. were mixed with air (Q=0.36 m³/hr) under excessive pressure of about P=0.8 MPa and then the mixture was downstreamed through the pipe at the rate of 0.65 m/sec. This stream divided into two, one of which went to the upper injector, and other one to the bottom injector; thus two loops were formed through which the air-water mixture recirculated (FIG. 2(a)). The volume of the water that flowed through the bottom injector was 20 m³/hr, and through upper injector, 40.5 m³/hr. Water, which had been saturated with air was withdrawn at the rate of 0.11 m/sec.

The saturation time for sewage with air was 0.65 min. If a traditional saturator was used in the known method the saturation time was 3–5 min.

INDUSTRIAL USAGE/APPLICATIONS

Some areas of application of present invention were already shown while specific examples of use for these methods were described, though they are not limited to those listed industrial areas.

We claim:

1. A method of separation of suspensions by flotation, which comprises the mixing of an incoming suspension with a flotoagent (10), subjecting the flotoagent containing incoming suspension to an initial flotation separation to form liquid (4) and solid (3) phases wherein the mixing and separation take place in the same unit (2), withdrawal (3) of the solid phase, saturation (7) of the liquid phase with air under excessive pressure followed by dividing the saturated liquid phase into two streams, one of said streams is treated to additional flotation separation (9) after which a clarified liquid is withdrawn (11) and the flotocomplexes formed in the additional flotation separation are employed as flotoagents in the initial flotation separation, the other saturated stream from the saturator (7) is sent for mixing with the incoming suspension (1).

2. A method of separation of suspensions by flotation, which comprises the mixing of an incoming suspension (1) with a flotoagent (10), subjecting the flotoagent containing incoming suspension to an initial flotation separation to form a liquid (4) and solid (3) phases wherein the mixing and separation take place in the same unit (2), withdrawal of the solid phase (3) and saturation (7) of the liquid phase with air under excessive pressure followed by subjecting the saturated liquid phase to an additional flotation separation (9) to form a clarified liquid (11) and floated flotocomplexes (10) which are employed as the flotoagent in the initial flotation separation, dividing the clarified liquid (11) to form, as a first part, a final clarified liquid effluent and a second part of the clarified liquid is recycled back to the saturator (7).

* * * * *